(12) United States Patent
Stanfill et al.

(10) Patent No.: US 7,584,205 B2
(45) Date of Patent: Sep. 1, 2009

(54) AGGREGATING DATA WITH COMPLEX OPERATIONS

(75) Inventors: Craig W. Stanfill, Lincoln, MA (US); Marshall A. Isman, Newton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 340 days.

(21) Appl. No.: 11/169,073

(22) Filed: Jun. 27, 2005

(65) Prior Publication Data

US 2006/0294129 A1      Dec. 28, 2006

(51) Int. Cl.
*G06F 17/30* (2006.01)

(52) U.S. Cl. .......................................... 707/102; 707/2
(58) Field of Classification Search .................. 707/100, 707/2, 102
See application file for complete search history.

(56) References Cited

U.S. PATENT DOCUMENTS

| | | | | |
|---|---|---|---|---|
| 5,537,589 A | * | 7/1996 | Dalal | 707/101 |
| 5,713,020 A | * | 1/1998 | Reiter et al. | 707/102 |
| 5,784,246 A | | 7/1998 | Steinz et al. | |
| 5,960,435 A | * | 9/1999 | Rathmann et al. | 707/101 |
| 5,966,072 A | | 10/1999 | Stanfill et al. | |
| 6,279,149 B1 | | 8/2001 | Field et al. | |
| 6,282,544 B1 | | 8/2001 | Tse et al. | |
| 6,385,604 B1 | * | 5/2002 | Bakalash et al. | 707/3 |
| 6,434,544 B1 | | 8/2002 | Bakalash et al. | |

OTHER PUBLICATIONS

Huhtala, Ykä et al., "An Efficient Algorithm for Discovering Functional and Approximate Dependencies", *The Computer Journal*, 42:100-111, 1999.

* cited by examiner

*Primary Examiner*—Cheryl Lewis
(74) *Attorney, Agent, or Firm*—Fish & Richardson P.C.

(57) ABSTRACT

Aggregating data includes accepting a first data set that includes records, each record holding a value for each of a plurality of fields. A second data set is generated from the first data set. The second data set includes one or more aggregated records each corresponding to one or more records from the first data set that match values in a subset of fields. A third data set is generated from the second data set. The third data set includes one or more aggregated records each corresponding to one or more aggregated records of the first data set that match values in a subset of fields. An aggregate value associated with an aggregated record in the third data set represents a result of performing a non-cascadable operation on values associated with a plurality of records from the first data set.

17 Claims, 7 Drawing Sheets

| Row | Product | Distributor | Year | Location | Sold | Price |
|---|---|---|---|---|---|---|
| 1 | A | X | 2001 | E | 10 | 20 |
| 2 | A | X | 2001 | W | 12 | 20 |
| 3 | A | X | 2003 | E | 11 | 22 |
| 4 | B | Y | 2002 | E | 11 | 21 |
| 5 | B | Y | 2003 | E | 10 | 21 |
| 6 | C | X | 2001 | W | 12 | 22 |
| 7 | C | X | 2002 | E | 12 | 23 |

| Row | Product | Year | Location | Sold | Price |
|---|---|---|---|---|---|
| 1 | A | 2001 | E | 22 | 40 |
| 2 | A | 2003 | E | 11 | 22 |
| 3 | B | 2002 | E | 11 | 21 |
| 4 | B | 2003 | E | 10 | 21 |
| 5 | C | 2001 | W | 12 | 22 |
| 6 | C | 2002 | E | 12 | 23 |

120

| Row | Product | Sold | Price |
|---|---|---|---|
| 1 | A | 33 | 62 |
| 2 | B | 21 | 42 |
| 3 | C | 24 | 45 |

| | Sold | Price |
|---|---|---|
| Global | 78 | 149 |

| Row | Distributor | Distinct Products |
|---|---|---|
| 1 | X | 2 |
| 2 | Y | 1 |

| Row | Year | Distinct Products |
|---|---|---|
| 1 | 2001 | 2 |
| 2 | 2002 | 2 |
| 2 | 2003 | 2 |

| | Distinct Products |
|---|---|
| Global | 3 |

FIG. 2G

# AGGREGATING DATA WITH COMPLEX OPERATIONS

BACKGROUND

The invention relates to aggregating data with complex operations.

There are a variety of Online Analytical Processing (OLAP) techniques that allow a user to analyze multidimensional data stored in a database. Typically, the database includes a "fact table" that has a number of dimensions (or "key fields") storing values that serve as indices into the multidimensional data and a number of attributes (or "non-key fields") storing other values. A user can perform queries on the data that involve computing aggregates of the multidimensional data. To increase the efficiency of such queries, typical OLAP schemes pre-compute some of the possible aggregates.

SUMMARY

In a general aspect, the invention features a method, and corresponding software and system, for aggregating data. The method includes accepting a first data set, the first data set including records, each record holding a value for each of a plurality of fields. A second data set is generated from the first data set, the second data set including one or more aggregated records. Each aggregated record of the second data set corresponds to one or more records from the first data set that match values in a subset of fields associated with that aggregated record. A third data set is generated from the second data set, the third data set including one or more aggregated records. Each aggregated record of the third data set corresponds to one or more aggregated records of the first data set that match values in a subset of fields associated with that aggregated record of the third data set. An aggregate value associated with an aggregated record in the third data set represents a result of performing a non-cascadable operation on values associated with a plurality of records from the first data set.

This aspect can include one or more of the following features.

Performing a non-cascadable operation on values associated with a plurality of records from the first data set is one of the group consisting of: determining a number of distinct values among said values, determining a median of said values, determining a sum of a plurality of extrema over said values, and determining an extremum of a plurality of sums of said values.

The non-cascadable operation is such that a result of performing the non-cascadable operation on a set of operands does not decompose into a result of the operation performed on: a first result of the operation performed on a first subset of the operands, and a second result of the operation performed on a second subset of the operands; where the first and second subsets are mutually exclusive and exhaustive.

At least one of the plurality of fields is at least partially functionally dependent on another of the plurality of fields.

At least some values associated with at least one of the plurality of fields are dependent on a corresponding value associated with another of the plurality of fields.

Generating the third data set from the second data set includes receiving a flow of aggregated records of the second data set.

In another general aspect, the invention features a method for aggregating data comprising a plurality of records, each record holding a value for each of a plurality of fields. The method includes performing a multi-stage aggregation of fields within such records using a non-cascadable operation, taking into account functional dependencies between the fields.

This aspect can include one or more of the following features.

The non-cascadable operation is one of the group consisting of: determining a number of distinct values among said values, determining a median of said values, determining a sum of a plurality of extrema over said values, and determining an extremum of a plurality of sums of said values.

The non-cascadable operation is such that a result of performing the non-cascadable operation on a set of operands does not decompose into a result of the operation performed on: a first result of the operation performed on a first subset of the operands, and a second result of the operation performed on a second subset of the operands; where the first and second subsets are mutually exclusive and exhaustive.

In another general aspect, the invention features a method, and corresponding software and system, for aggregating data. The method includes accepting a first data set, the first data set including records, each record holding a value for each of a plurality of fields. The method includes generating a Cartesian product of records of the first data set and a first plurality of key sets. Each key set represents a subset of the fields of the first data set. The method includes generating a second data set from the generated Cartesian product, the second data set including one or more aggregated records, each aggregated record corresponding to one or more records from the first data set that match values in a subset of fields associated with the aggregated record. The method includes generating a third data set from the second data set, the third data set including one or more aggregated records, each aggregated record of the third data set corresponding to one or more aggregated records of the first data set that match values in a subset of fields associated with that aggregated record of the third data set.

This aspect can include one or more of the following features.

Generating the third data set includes performing a join operation on the generated Cartesian product and a data set whose records contain a first value that represents one of the first plurality of key sets and a second value that represents one of a second plurality of key sets, each of the second plurality of key sets representing a subset of the fields of the second data set; where the join operation joins records with matching key sets.

Generating the third data set includes, for at least some joined records, replacing a value for at least one of the fields with a wildcard value.

Generating the second data set includes, for at least some records of the generated Cartesian product, replacing a value for at least one of the fields with a wildcard value.

Aspects of the invention can include one or more of the following advantages.

By taking advantage of functional dependencies between fields in a data set (e.g., between a key field and a field being operated upon) an aggregation computation can be decomposed into multiple stages. A multi-stage aggregation taking into account functional dependencies can be used to aggregate data based on non-cascadable operations. By decomposing an aggregation computation into multiple stages, the size of the aggregation computation can be reduced.

Other features and advantages of the invention will become apparent from the following description, and from the claims.

DESCRIPTION OF DRAWINGS

FIGS. 2B-2G are tables representing aggregated data based on the data in FIG. 2A.

DESCRIPTION

1 Overview

Figure 1:
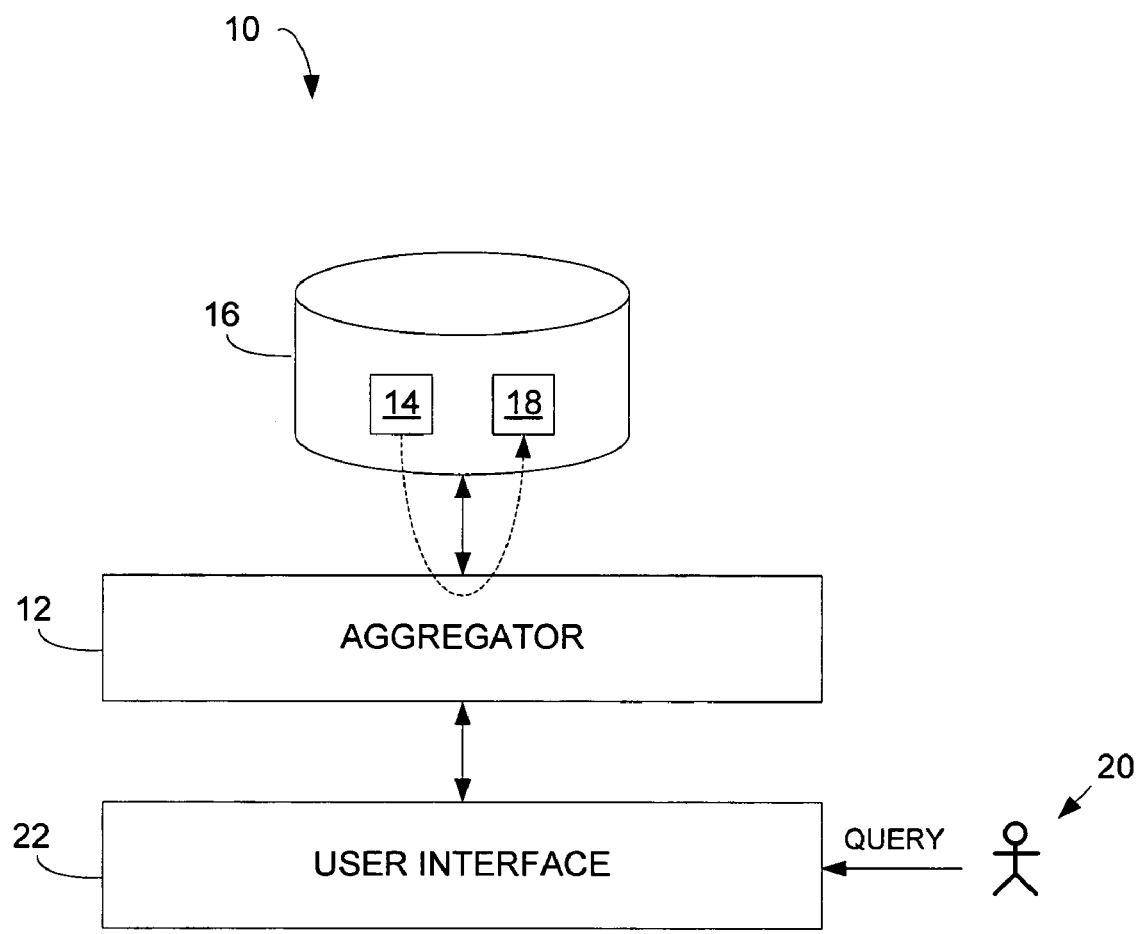
FIG. 1 is a data aggregation system.

Referring to FIG. 1, a data aggregation system 10 includes a data aggregator 12 that processes information in an input table 14 in a data store 16 to generate information for storage in an aggregated table 18. In some cases, the data aggregator 12 generates the aggregated table 18 based on a query produced by a user 20 over a user interface 22. In other cases, the data aggregator 12 generates the aggregated table 18 according to a pre-computation scheme. This aggregation provides a summary of the data in the input table 14 which is useful to the user 20.

Figure 2A:
FIG. 2A is a table representing multidimensional data.
Figure 2B:

Referring to FIG. 2A, the rows 1-7 of table 100 represent records of a multidimensional data set from which aggregated data can be generated. Table 100 is a 4-dimensional data set that includes four columns representing key fields Product, Distributor, Year and Location and two columns representing non-key fields Number Sold and Price. A user query may ask for the sum of Number Sold broken down by Year, Product and Location and aggregated over Distributor. Such an aggregation is referred to as a 3-dimensional aggregate because, of the original four key fields, aggregation is over one key field with 3 key fields remaining. The combining of records having the same values of the remaining key fields according to an operation upon which the aggregation is based is referred to as the "aggregation operation." In this case, the aggregation operation is a sum of values in the non-key fields. FIG. 2B shows a table 110 representing the resulting 3-dimensional aggregated data set for this example.

As another example, a user may ask for the sum of Number Sold or Price broken down by Product and aggregated over Year, Distributor and Location (a 1-dimensional aggregate). In this case aggregating involves combining rows having the same value for the single remaining key field Product. FIG. 2C shows a table 120 representing the resulting 1-dimensional aggregated data set. The sum of Number Sold and/or Price aggregated over all four key fields yields a 0-dimensional aggregate (or a single "global aggregate" value) represented by table 130 in FIG. 2D.

One approach to providing aggregated data to a user is to pre-compute some or even all of the possible aggregates that may be used in queries of the multidimensional data. Such pre-computation can involve large computations that can take considerable amounts of time. For example, pre-computation of all aggregates having four or fewer dimensions from a multidimensional data set having 14 dimensions involves $_{14}C_4 + _{14}C_3 + _{14}C_2 + _{14}C_1 + _{14}C_0 = 1471$ aggregates. If the data set has $10^7$ rows of data, then the pre-computation can therefore involve processing as many as $1.471 \times 10^{10}$ rows of data.

One strategy for reducing the amount of computation required for pre-computation of multidimensional aggregates includes generating the aggregates in multiple stages, computing lower dimensional aggregates based on higher dimensional aggregates. For example, 15 of the $_{14}C_4$ 4-dimensional aggregates can be computed from a single 6-dimensional aggregate by aggregating over 2 of the dimensions of the 6-dimensional aggregate $_6C_2 = 15$ times. If the 6-dimensional aggregate has, for example, $10^4$ rows of data, then the pre-computation of these 15 4-dimensional aggregates would involve processing the $10^7$ rows of data to generate the 6-dimensional aggregate and then processing $15 \times 10^4 = 150,000$ rows of data to generate the 15 4-dimensional aggregates, for a total processing of 10,150,000 rows of data. For comparison, pre-computing each of these 15 4-dimensional aggregates independently from the 14-dimensional data would involve processing $15 \times 10,000,000 = 150,000,000$ rows of data.

The system 10 for processing multidimensional data to generate aggregated data (e.g., for pre-computation and/or in response to a user query) uses different approaches for multi-stage aggregation depending on whether the operation involved is "cascadable." An operation is cascadable if a result of performing the operation on a set of operands can be decomposed into a result of the operation performed on: (a) a first result of the operation performed on a first subset of the operands, and (b) a second result of the operation performed on a second subset of the operands (where the first and second subsets are mutually exclusive and exhaustive). For example, addition is cascadable because of the associative property of addition: $(a+b+\ldots+z) = (a+b+\ldots+m)+(n+o+\ldots+z)$.

Examples of cascadable operations include performing summation and determining a maximum or minimum (i.e., an "extremum") of values in the rows of data. In the example above, the sums of the values in the Number Sold and Price fields in table 130 (FIG. 2D) can be computed in a single stage from the original data set in table 100 or, alternatively, in multiple stages using intermediate aggregated data sets such as those in table 110 (FIG. 2B) or table 120 (FIG. 2C). Such use of multiple stages is possible because the summation operation involved is cascadable, allowing the system 10 to use a first multi-stage aggregation process that decomposes the fields to be aggregated into sets of intermediate dimension, as described in more detail below in section 2.2.

Examples of non-cascadable operations that can be used for aggregating records in a multidimensional data set include: determining a number of distinct values for a field of the records, determining a median of the values in a field, determining a sum of multiple extrema over sets of values (e.g., the sum of the most expensive products for each location), and determining an extremum of multiple sums of values (e.g., the largest yearly total sold). So even though a single associative operation (such as addition or finding a maximum) is cascadable, a compound operation including two associative operations may not be cascadable, as in the "sum of extrema" and "extremum of sums" examples above.

FIGS. 2E and 2F show examples of aggregated data based on a non-cascadable operation. FIG. 2E shows a table 140 representing the result of aggregating the records of table 100 over Product, Year and Location based on an operation counting the number of distinct values for the Product field, broken down by Distributor. FIG. 2F shows a table 150 representing the result of aggregating the records of table 100 over Product, Distributor and Location based on an operation counting the number of distinct values for the Product field, broken down by Year.

FIG. 2G shows a table 160 representing a global aggregate value of the number of distinct values for the Product field. In this example, there are 3 distinct products A, B and C, as determined by aggregating the records of table 100. Since this "count distinct" operation is non-cascadabale, the global value is not necessarily obtained from intermediate aggregated data such as the data in table 140 or table 150. In this example, the sum of the intermediate "Distinct Products" values in table 140 does give the correct result of 3 distinct products due to functional dependencies in the original data of table 100. However, the sum of the intermediate "Distinct Products" values in table 150 gives an incorrect result of 6 distinct products.

The system 10 is able to take advantage of functional dependencies to process the rows of data for multi-stage aggregation based on non-cascadable operations by using a second multi-stage aggregation process, as described in more detail below in section 2.4. In this example, each product has a single distributor, so there is a functional dependency between Distributor and Product (i.e., the value of Distributor is functionally dependent on the value of Product). This functional dependency enables a correct result to be obtained from intermediate data for this aggregation based on a non-cascadable operation, with proper selection of the intermediate data.

2 Aggregating Data Using Data Flow Graphs

In the system 10 computations on the multidimensional data are expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. Examples of aggregation calculations on multidimensional data sets are described below using such "data flow graphs" to implement the aggregator 12 in the system 10.

2.1 Single-Stage Aggregation

Figure 3:
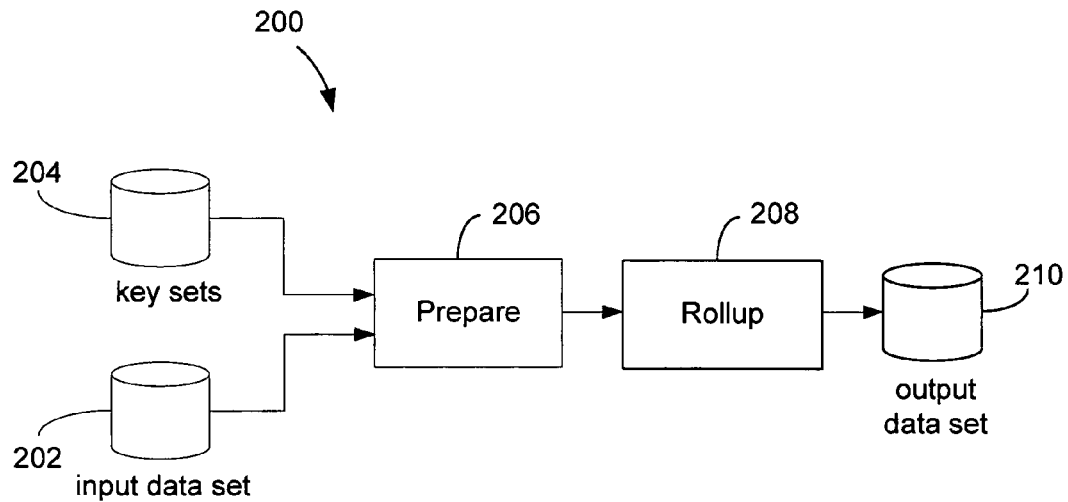
FIGS. 3 and 5 are data flow graphs for single-stage aggregation.

Referring to FIG. 3, a data flow graph 200 for computing single-stage aggregation includes an input data set 202 (e.g., input table 14) and an output data set 210 (e.g., aggregated table 18). Input data set 202 is the source of a series records each including values for a set of fields. Some of the fields are key fields for the multidimensional data in the input data set 202. A Prepare component 206 processes the records in preparation for processing by a Rollup component 208. The Prepare component 206 processes the records based on a "key sets" input file 204 that specifies one or more sets of keys to be used to aggregate the data. The Rollup component 208 combines information from multiple input records based on a selected operation and produces a single output record in place of the multiple input records. The flow of aggregated records from the Rollup component 208 are stored in the output data set 210.

In an example of performing single-stage aggregation, the graph 200 processes records in the 2-dimensional input data set 202 represented in the table below as rows having integer values for two key fields key0 and key1 and one non-key field attribute.

| key0 | key1 | attribute |
|------|------|-----------|
| 1    | 1    | 1         |
| 1    | 2    | 2         |
| 2    | 1    | 3         |
| 2    | 2    | 4         |

The graph 200 generates two 1-dimensional aggregated data sets based on the sum of the values in the attribute field broken down by one dimension (key field) and aggregated over the other. The "key sets" input file 204 specifies a first aggregation (eliminating key1 and retaining key0 by the singlet set {0}) and a second aggregation (eliminating key0 and retaining key1 by the singlet set {1}).

To save time when large numbers of aggregates are being computed (indicated by a large number of key sets), the Prepare component 206 generates a flow of records having "synthetic key" values that can be used to perform all of the aggregates being computed. For example, the Prepare component 206 generates records having a synthetic key that consists of the values of key0 and key1 based on a Cartesian product of the key sets in the input file 204 and the records in the input data set 202 (e.g., using a "join" operation on a null value { }). The result of performing such a Cartesian product for this example is given in the following table.

| key0 | key1 | attribute | key set |
|------|------|-----------|---------|
| 1    | 1    | 1         | {0}     |
| 1    | 2    | 2         | {0}     |
| 2    | 1    | 3         | {0}     |
| 2    | 2    | 4         | {0}     |
| 1    | 1    | 1         | {1}     |
| 1    | 2    | 2         | {1}     |
| 2    | 1    | 3         | {1}     |
| 2    | 2    | 4         | {1}     |

The Prepare component 206 introduces a "wildcard" value (e.g., "*") for values in key fields of a record (row) that are not part of the corresponding key set. The result of introducing the wildcard values for this example is given in the following table.

| key0 | key1 | attribute | key set |
|------|------|-----------|---------|
| 1    | *    | 1         | {0}     |
| 1    | *    | 2         | {0}     |
| 2    | *    | 3         | {0}     |
| 2    | *    | 4         | {0}     |
| *    | 1    | 1         | {1}     |
| *    | 2    | 2         | {1}     |
| *    | 1    | 3         | {1}     |
| *    | 2    | 4         | {1}     |

The resulting flow of records generated by the Prepare component 206 are then processed by the Rollup component 208. The Rollup component 208 sums the values in attribute field for records whose synthetic key values match (where wildcard values match only other wildcard values). The resulting output data set including the two 1-dimensional aggregated data sets generated by the graph 200 are represented by the following table.

| key0 | key1 | sum(attribute) |
|------|------|----------------|
| 1    | *    | 3              |
| 2    | *    | 7              |
| *    | 1    | 4              |
| *    | 2    | 6              |

The first two rows represent the sum of the values in the attribute field broken down by key0 and aggregated over key1. The last two rows represent the sum of the values in the attribute field broken down by key1 and aggregated over key0.

Any of a variety of representations can be used for storing the synthetic keys associated with the records in the data flow. For example, instead of the array of key field values (some of which are wildcards) used in this example, each record can be associated with an array of key-value pairs for non-wildcard values (which may be a more efficient representation when the dimensionality of the data set is large compared to the dimensionality of the key sets).

2.2 Multi-Stage Aggregation for Cascadable Operations

Figure 4:
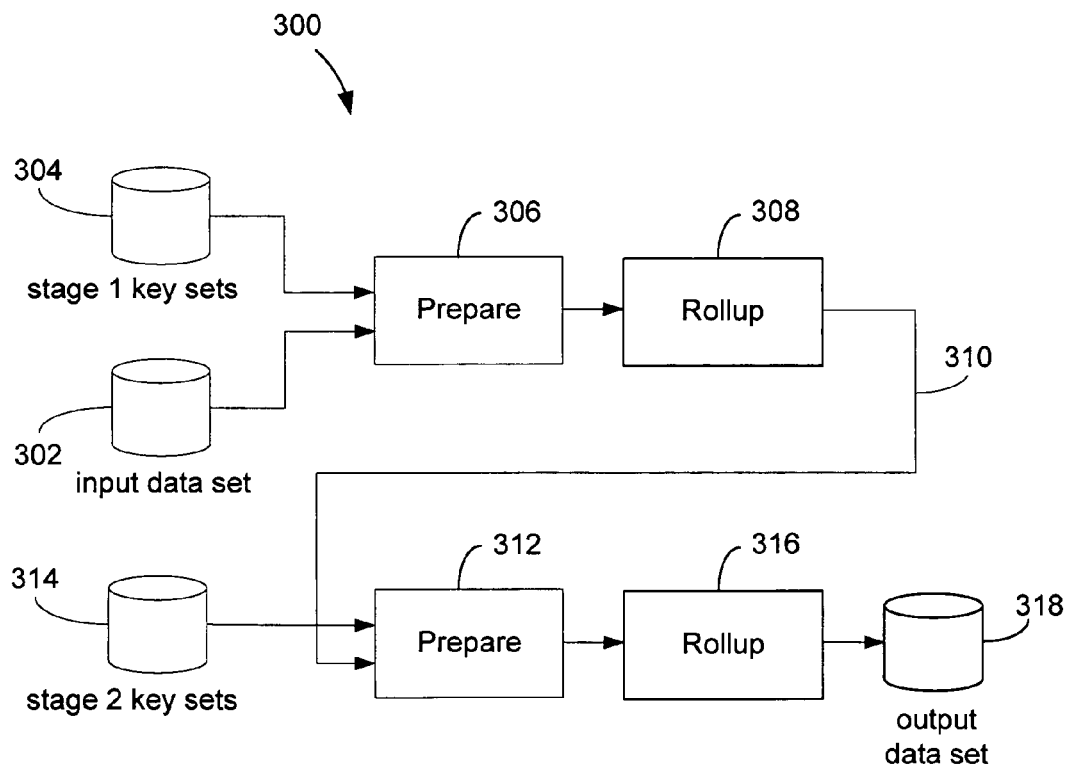
FIGS. 4, 6 and 7 are data flow graphs for multi-stage aggregation.

Referring to FIG. 4, a data flow graph 300 for computing a multi-stage aggregation includes an input data set 302 and an output data set 318. Input data set 302 is the source of a series records to be processed by a Prepare component 306 and a Rollup component 308, based on an input file 304 that specifies a first set of one or more sets of keys to be used to aggregate the data. The output of the Rollup component 308 is a flow of records 310 that represent an aggregated set of data whose dimension is intermediate to the dimensions of the input data set 302 and the output data set 318. This intermediate data can be stored in a data set to be used for later queries or data processing, or alternatively can remain a flow of records without necessarily being stored in a file. The records 310 are processed by a Prepare component 312 and a Rollup component 316, based on an input file 314 that specifies a second set of one or more sets of keys to be used to aggregate the data. The flow of aggregated records from the Rollup component 316 are stored in the output data set 318.

In an example of performing a multi-stage aggregation for a cascadable operation, the graph 300 processes records in the 4-dimensional input data set 302 represented in the table below as rows having integer values for four key fields key0, key1, key2 and key3 and one non-key field attribute and produces a data set that includes all six 2-dimensional summation aggregates.

| key0 | key1 | key2 | key3 | attribute |
|------|------|------|------|-----------|
| 1    | 1    | 1    | 1    | 1         |
| 1    | 1    | 1    | 2    | 2         |
| 1    | 1    | 2    | 2    | 3         |

The input files 304 and 314 specify a "rollup plan" that includes six first-stage key sets in the input file 304 and six second-stage key sets in the input file 314. Specifically, in this example, the graph 300 generates six 2-dimensional aggregated data sets based on the sum of the values in the attribute field broken down by two dimensions (key fields) and aggregated over the other two. Each of following six first-stage key sets represents the three key fields remaining in one of the three 3-dimensional intermediate aggregated data sets (within records 310):

key set 1-1: {0,1,2}
key set 1-2: {0,1,2}
key set 1-3: {0,1,2}
key set 1-4: {0,1,3}
key set 1-5: {0,1,3}
key set 1-6: {0,2,3}

Each of the following six second-stage key sets represents the two key fields remaining in one of the six 2-dimensional output aggregated data sets:

key set 2-1: {0,1}
key set 2-2: {0,2}
key set 2-3: {1,2}
key set 2-4: {0,3}
key set 2-5: {1,3}
key set 2-6: {2,3}

Each of the key fields in a second-stage key set is selected from the key fields in the corresponding first-stage key set (where the key set 2-n corresponds to the key set 1-n). The key fields in the first-stage key sets are selected to enable each of the six possible combinations of two fields to be represented in the second-stage key sets. The input file 314 stores each second stage key set (e.g., key set 2-1) in a record along with its associated first stage key set (e.g., key set 1-1) for use in generating synthetic key values, as described in more detail below.

Depending on the number of dimensions that are being aggregated in the first and second stages, in some cases, the choice of which first-stage key sets to use affects how many intermediate aggregated data sets need to be generated to calculate a given number of output aggregated data sets (which affects the efficiency of the overall calculation). In this example, the three intermediate aggregated data sets are needed to calculate the six output aggregated data sets regardless of which three of the four possible intermediate aggregated data sets are selected. A procedure is described below in section 2.3 for selecting first-stage key sets in a way that reduces the number of intermediate aggregated data sets needed in some cases. The Prepare component 306 generates records having a first stage synthetic key based on a Cartesian product of the distinct key sets (in this case 3 distinct key sets) in the input file 304 and the records in the input data set 302. The Prepare component 306 also introduces a wildcard value for values in key fields of a record (row) that are not part of the corresponding key set. The result of performing such a Cartesian product and introducing wildcard values for this example is given in the following table.

| key0 | key1 | key2 | key3 | attribute | key set 1 |
|------|------|------|------|-----------|-----------|
| 1    | 1    | 1    | *    | 1         | {0, 1, 2} |
| 1    | 1    | 1    | *    | 2         | {0, 1, 2} |
| 1    | 1    | 2    | *    | 3         | {0, 1, 2} |
| 1    | 1    | *    | 1    | 1         | {0, 1, 3} |
| 1    | 1    | *    | 2    | 2         | {0, 1, 3} |
| 1    | 1    | *    | 2    | 3         | {0, 1, 3} |
| 1    | *    | 1    | 1    | 1         | {0, 1, 2} |
| 1    | *    | 1    | 2    | 2         | {0, 2, 3} |
| 1    | *    | 2    | 2    | 3         | {0, 2, 3} |

The resulting flow of records generated by the Prepare component 306 are then processed by the Rollup component 308. The Rollup component 308 sums the values in attribute field for records whose synthetic key values (including wildcard values) match. The resulting intermediate records 310 are represented by the following table.

| key0 | key1 | key2 | key3 | attribute | key set 1 |
|------|------|------|------|-----------|-----------|
| 1    | 1    | 1    | *    | 3         | {0, 1, 2} |
| 1    | 1    | 2    | *    | 3         | {0, 1, 2} |
| 1    | 1    | *    | 1    | 1         | {0, 1, 3} |
| 1    | 1    | *    | 2    | 5         | {0, 1, 3} |
| 1    | *    | 1    | 1    | 1         | {0, 1, 2} |
| 1    | *    | 1    | 2    | 2         | {0, 2, 3} |
| 1    | *    | 2    | 2    | 3         | {0, 2, 3} |

The first two rows represent the sum of the values in the attribute field broken down by key0, key1 and key2 and aggregated over key1. The next two rows represent the sum of the values in the attribute field broken down by key0, key1 and key3 and aggregated over key2. The last three rows represent the sum of the values in the attribute field broken down by key0, key2 and key3 and aggregated over key1.

The Prepare component 312 generates records having a second stage synthetic key by performing a join operation on the intermediate records 310 represented in the table above and the key set records in the input file 314 represented in the table below. The value of key set 1 is used as the key for the join operation.

| key set 1 | key set 2 |
|---|---|
| {0, 1, 2} | {0, 1,} |
| {0, 1, 2} | {0, 2} |
| {0, 1, 2} | {1, 2} |
| {0, 1, 3} | {0, 3} |
| {0, 1, 3} | {1, 3} |
| {0, 2, 3} | {2, 3} |

The resulting joined records (including wildcard values for key fields not in the second stage key set) sent from the Prepare component 312 to the Rollup component 316 are represented in the table below.

| key0 | key1 | key2 | key3 | attribute | key set 1 | key set 2 |
|---|---|---|---|---|---|---|
| 1 | 1 | * | * | 3 | {0, 1, 2} | {0, 1} |
| 1 | 1 | * | * | 3 | {0, 1, 2} | {0, 1} |
| 1 | * | 1 | * | 3 | {0, 1, 2} | {0, 2} |
| 1 | * | 2 | * | 3 | {0, 1, 2} | {0, 2} |
| * | 1 | 1 | * | 3 | {0, 1, 2} | {1, 2} |
| * | 1 | 2 | * | 3 | {0, 1, 2} | {1, 2} |
| 1 | * | * | 1 | 1 | {0, 1, 3} | {0, 3} |
| 1 | * | * | 2 | 5 | {0, 1, 3} | {0, 3} |
| * | 1 | * | 1 | 1 | {0, 1, 3} | {1, 3} |
| * | 1 | * | 2 | 5 | {0, 1, 3} | {1, 3} |
| * | * | 1 | 1 | 1 | {0, 2, 3} | {2, 3} |
| * | * | 1 | 2 | 2 | {0, 2, 3} | {2, 3} |
| * | * | 2 | 2 | 3 | {0, 2, 3} | {2, 3} |

The Rollup component 208 sums the values in attribute field for records whose synthetic key values (including wildcard values) match. The resulting output data set including the six 2-dimensional aggregated data sets generated by the graph 300 are represented by the following table.

| key0 | key1 | key2 | key3 | attribute |
|---|---|---|---|---|
| 1 | 1 | * | * | 6 |
| 1 | * | 1 | * | 3 |
| 1 | * | 2 | * | 3 |
| * | 1 | 1 | * | 3 |
| * | 1 | 2 | * | 3 |
| 1 | * | * | 1 | 1 |
| 1 | * | * | 2 | 5 |
| * | 1 | * | 1 | 1 |
| * | 1 | * | 2 | 5 |
| * | * | 1 | 1 | 1 |
| * | * | 1 | 2 | 2 |
| * | * | 2 | 2 | 3 |

The rows in the table above represent the sum of the values in the attribute field broken down by key fields containing integer values and aggregated over the key fields containing wild card values.

2.3 Selection of Key Sets

The following is an exemplary procedure used by a Prepare component of a data flow graph for selecting first-stage key sets representing fields of intermediate aggregated data sets. The procedure is described in terms of an example for which the selection affects the number of intermediate aggregates needed. The example is for 2-dimensional data generated from 5-dimensional data (with key fields 0, 1, 2, 3, 4) via intermediate aggregates of 3 dimensions, which yields ten possible 2-dimensional output aggregated data sets (since $_5C_2=10$).

The component starts by selecting any first 3-dimensional key set: {4,3,2}, representing fields in a first intermediate aggregated data set. The component determines which output aggregated data sets can be generated from the first intermediate aggregated data set: {4,3}, {4,2}, {3,2}. The component then searches for a second key set from which the maximum number of remaining output aggregated data sets can be generated: {4,1,0}, which can generate {4,1}, {4,0}, {1,0}. Repeating this step until all 2-dimensional output aggregated data sets are generated yields the additional key sets {3,2,1} and {3,2,0}, for a total of four first-stage key sets.

Other choices of first-stage key sets yield a higher number from which all 2-dimensional output aggregated data sets can be generated. For example, selecting first-stage key sets in the following order: {4,3,2}, {4,3,1}, {4,3,0}, {4,2,1}, {4,2,0}, {3,2,0} yields six first-stage key sets. Therefore, in some cases in which there are hundreds or thousands of possible intermediate key sets, selecting key sets according to the procedure described above can reduce the number of intermediate aggregated data sets that need to be generated.

2.4 Aggregation for Non-Cascadable Operations

In some cases, computing aggregates of multidimensional data based on non-cascadable operations involves computing most of the desired aggregates directly from the original data set, since some information needed to compute the aggregates is lost in the aggregates of intermediate dimension. However, in other cases, the aggregates of intermediate dimension do contain the information needed to compute some of the aggregates. One such case is for a data set in which values of one key field are dependent upon values of another key field.

2.4.1 Single-Stage Aggregation without Functional Dependency

Before describing a case in which functional dependencies are used to reduce the size of an aggregation computation by decomposing the computation into multiple stages, it is helpful to describe a single-stage approach to computing aggregates based on a non-cascadable "count distinct" operation performed for a target field.

Figure 5:
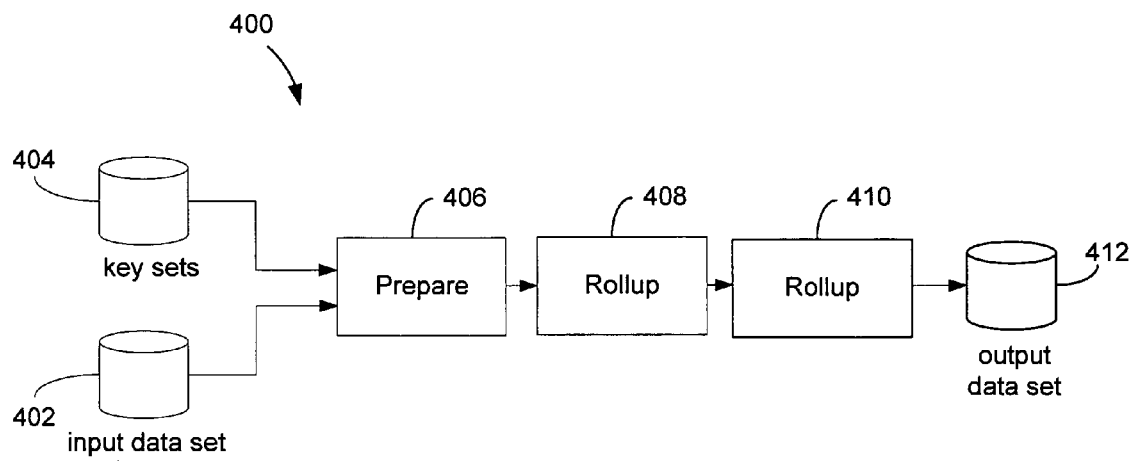

Referring to FIG. 5, a data flow graph 400 for computing a single-stage aggregation includes an input data set 402 and an output data set 412. The graph 400 includes a Prepare component 406 that processes the records based on an input file 404 to generate a flow of records including synthetic keys corresponding to the desired aggregates. This graph 400 is configured to perform the "count distinct" operation using Rollup component 408 and Rollup component 410. Rollup component 408 combines records based on values of the target field such that each distinct value appears once for each value of the synthetic key. This first rollup operation enables the Rollup component 410 to determine the number of distinct values in the target field by counting the number of records having matching synthetic keys. A flow of aggregated records from the Rollup component 410 are stored in the output data set 412.

Even though this data flow graph 400 includes multiple rollup components, the aggregation computation that it performs is a single-stage aggregation since the output is not generated based on data of intermediate dimensions.

In an example of performing single-stage aggregation based on the non-cascadable "count distinct" operation, the graph 400 processes records in the 2-dimensional input data set 402 represented in the table below as rows having integer values for two key fields key0 and key1 and one non-key field target that is the target of the "count distinct" operation.

| key0 | key1 | target |
|------|------|--------|
| 0 | 0 | 0 |
| 0 | 1 | 0 |
| 0 | 1 | 0 |
| 1 | 0 | 0 |
| 0 | 0 | 1 |
| 2 | 0 | 1 |

The graph 400 generates two 1-dimensional aggregated data sets and the global aggregate based on the "count distinct" operation performed on the target field. The input file 404 specifies the corresponding key sets as {0} and {1} for the 1-dimensional aggregates and as { } for the global aggregate.

The Prepare component 406 generates a flow of records having synthetic key values based on a Cartesian product of these key sets in the input file 404 and the records in the input data set 402 with wildcard values for key fields not in the key set, represented in the following table.

| key0 | key1 | target | key set |
|------|------|--------|---------|
| 0 | * | 0 | {0} |
| 0 | * | 0 | {0} |
| 0 | * | 0 | {0} |
| 1 | * | 0 | {0} |
| * | 0 | 0 | {1} |
| * | 1 | 0 | {1} |
| * | 1 | 0 | {1} |
| * | 0 | 0 | {1} |
| * | * | 0 | { } |
| * | * | 0 | { } |
| * | * | 0 | { } |
| * | * | 0 | { } |
| 0 | * | 1 | {0} |
| 2 | * | 1 | {0} |
| * | 0 | 1 | {1} |
| * | 0 | 1 | {1} |
| * | * | 1 | { } |
| * | * | 1 | { } |

The Rollup component 408 combines records based on matching values of the synthetic key and the target field which removes duplicate records. The resulting records following table.

| key0 | key1 | target | key set |
|------|------|--------|---------|
| 0 | * | 0 | {0} |
| 1 | * | 0 | {0} |
| * | 0 | 0 | {1} |
| * | 1 | 0 | {1} |
| * | * | 0 | { } |
| 0 | * | 1 | {0} |
| 2 | * | 1 | {0} |
| * | 0 | 1 | {1} |
| * | * | 1 | { } |

The Rollup component 410 combines records with matching synthetic key values (key0 and key1) and counts the number of records combined to generate a number of distinct target field values. The resulting output data set including the two 1-dimensional aggregated data sets and the global aggregate generated by the graph 400 are represented by the following table.

| key0 | key1 | count distinct(target) |
|------|------|------------------------|
| 0 | * | 2 |
| 1 | * | 1 |
| 2 | * | 1 |
| * | 0 | 2 |
| * | 1 | 1 |
| * | * | 2 |

The first three rows represent the number of distinct values in the target field broken down by key0 and aggregated over key1. The next two rows represent the number of distinct values in the target field broken down by key1 and aggregated over key0. The last row represents the total number of distinct values in the target field aggregated over both key fields.

2.4.2 Stages Based on Functional Dependencies

In this multi-stage approach for non-cascadable operations, in order to ensure that the aggregates of intermediate dimension contain the information needed to generate the desired aggregates based on these aggregates of intermediate dimension, at least one of the key fields should be at least partially functionally dependent on another of the key fields. Functional dependencies between values of fields (e.g., between a key field and a target field) can occur in various types of data. For example, if one field value represents an individual (e.g., customer ID), then the value of another field representing an attribute such as gender, ethnicity, or date of birth will be functionally dependent on that field value. One field is "partially" or "approximately" functionally dependent on another field when there are exceptions to the functional dependency, as described in more detail below in section 3.1.

Figure 6:
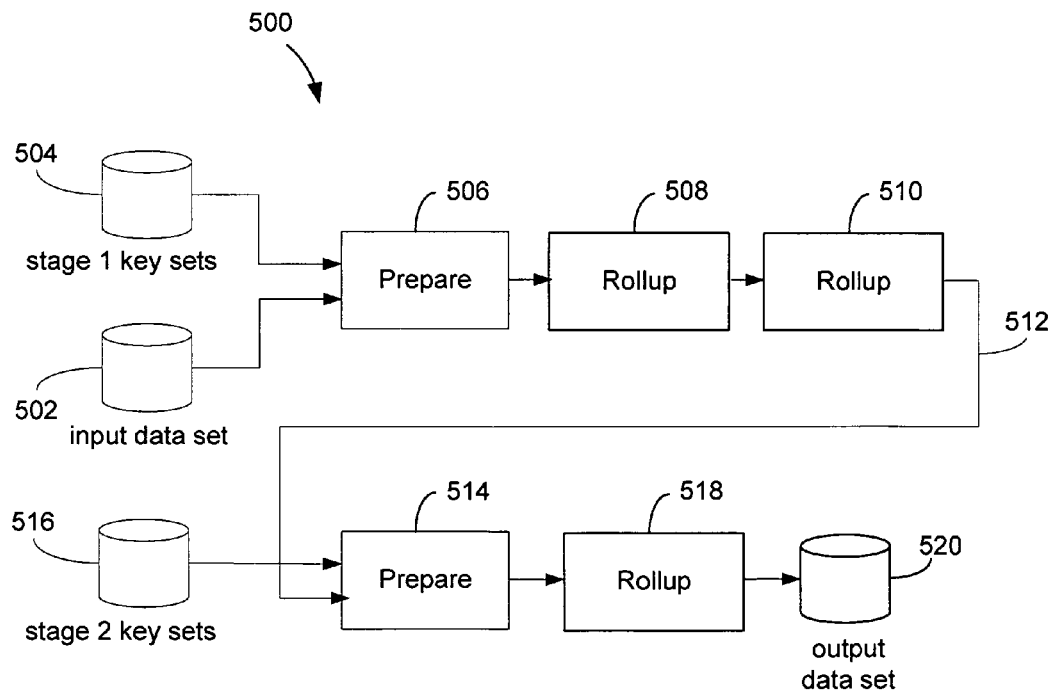

FIG. 6 shows a data flow graph 500 that includes a first stage that generates aggregated records 512 of reduced dimension relative to the input data set 502. The first stage includes a Prepare component 506 and two Rollup components 508 and 510 that function as described above for graph 400. The input file 504 includes key sets that include "non-dependent" key fields that do not depend on the target field of the aggregation operation. The graph 500 also includes a second stage that further aggregates records 512 based on key sets in input file 516 that include "dependent" key fields that do depend on the target field. That is, any field that depends on a target field is aggregated in the last stage.

In an example of performing a multi-stage aggregation based on the non-cascadable "count distinct" operation, the graph 500 processes records in the 2-dimensional input data set 502 represented in the table below as rows having integer values for two key fields key0 and key1 and one non-key field target that is the target of the "count distinct" operation. Key field key0 is functionally dependent on the target field.

| key0 | key1 | target |
|------|------|--------|
| 0    | 1    | 0      |
| 0    | 1    | 0      |
| 0    | 3    | 0      |
| 1    | 2    | 1      |
| 1    | 3    | 1      |
| 0    | 1    | 2      |
| 0    | 2    | 2      |

The graph 500 generates two 1-dimensional aggregated data sets and the global aggregate based on the "count distinct" operation performed on the target field. The input files 504 and 516 specify a "rollup plan" that includes three first stage key sets in the input file 504 and three second stage key sets in the input file 516. The first stage includes a rollup based on values of the non-dependent key field key1, included in the first stage key sets:

key set 1-1: { }
key set 1-2: { }
key set 1-3: {1}

In this multi-stage approach for non-cascadable operations, the key fields in the second-stage key sets are not necessarily selected only from the key fields in the corresponding first-stage key set. However, the key fields in the first-stage and second-stage key sets are chosen to enable non-dependent dimensions to be aggregated in the first stage and dependent dimensions to be aggregated in the second stage, as in this example. In this example, the second stage includes a rollup based on values of the dependent key field key0, included in the second stage key sets:

key set 2-1: {0 }
key set 2-2: { }
key set 2-3: {1}

The Prepare component 506 generates a flow of records having synthetic key values based on a Cartesian product of the first stage key sets in the input file 504 and the records in the input data set 502 with wildcard values for any non-dependent key fields not in the first stage key set, represented in the following table.

| key0 | key1 | target | key set 1 |
|------|------|--------|-----------|
| 0    | *    | 0      | { }       |
| 0    | *    | 0      | { }       |
| 0    | *    | 0      | { }       |
| 0    | 1    | 0      | {1}       |
| 0    | 1    | 0      | {1}       |
| 0    | 3    | 0      | {1}       |
| 1    | *    | 1      | { }       |
| 1    | *    | 1      | { }       |
| 1    | 2    | 1      | {1}       |
| 1    | 3    | 1      | {1}       |
| 0    | *    | 2      | { }       |
| 0    | *    | 2      | { }       |
| 0    | 1    | 2      | {1}       |
| 0    | 2    | 2      | {1}       |

The Rollup component 508 combines records based on matching values of the synthetic key and the target field which removes duplicate records. Optionally, the dependent key field key0 can be left out of the first stage synthetic key (i.e., not considered in matching) since its value is dependent on the value of the target field. The resulting records are represented in the following table.

| key0 | key1 | target | key set 1 |
|------|------|--------|-----------|
| 0    | *    | 0      | { }       |
| 0    | 1    | 0      | {1}       |
| 0    | 3    | 0      | {1}       |
| 1    | *    | 1      | { }       |
| 1    | 2    | 1      | {1}       |
| 1    | 3    | 1      | {1}       |
| 0    | *    | 2      | { }       |
| 0    | 1    | 2      | {1}       |
| 0    | 2    | 2      | {1}       |

The Rollup component 510 combines records with matching synthetic key values (key0 and key1) and counts the number of records combined to generate a number of distinct target field values. It is not necessary to include the values of the target field in the resulting combined records. The resulting intermediate records 512 represented in the following table includes 1-dimensional aggregated records and 2-dimensional aggregated records.

| key0 | key1 | key set 1 | count distinct(target) |
|------|------|-----------|------------------------|
| 0    | *    | { }       | 2                      |
| 1    | *    | { }       | 1                      |
| 0    | 1    | {1}       | 2                      |
| 0    | 2    | {1}       | 1                      |
| 0    | 3    | {1}       | 1                      |
| 1    | 2    | {1}       | 1                      |
| 1    | 3    | {1}       | 1                      |

The Prepare component 514 generates records having a second stage synthetic key by performing a join operation on the intermediate records 512 represented in the table above and the key set records in the input file 516 represented in the table below. The value of key set 1 is used as the key for the join operation.

| key set 1 | key set 2 |
|-----------|-----------|
| { }       | {0}       |
| { }       | { }       |
| {1}       | {1}       |

The resulting joined records (including wildcard values for key fields not in the second stage key set) sent from the Prepare component 514 to the Rollup component 518 are represented in the table below.

| key0 | key1 | key set 1 | key set 2 | count distinct(target) |
|------|------|-----------|-----------|------------------------|
| *    | *    | { }       | { }       | 2                      |
| *    | *    | { }       | { }       | 1                      |
| 0    | *    | { }       | {0}       | 2                      |
| 1    | *    | { }       | {0}       | 1                      |
| *    | 1    | {1}       | {1}       | 2                      |
| *    | 2    | {1}       | {1}       | 1                      |
| *    | 3    | {1}       | {1}       | 1                      |
| *    | 2    | {1}       | {1}       | 1                      |
| *    | 3    | {1}       | {1}       | 1                      |

The Rollup component 518 combines records with matching synthetic key values (key 0 and key1) and sums the corresponding values in the "count distinct(target)" field to generate a number of distinct target field values. The resulting output records represented in the following table are stored in output data set 520.

| key0 | key1 | count distinct(target) |
|------|------|------------------------|
| *    | *    | 3                      |
| 0    | *    | 2                      |
| 1    | *    | 1                      |
| *    | 1    | 2                      |
| *    | 2    | 2                      |
| *    | 3    | 2                      |

The rows in the table above represent the number of distinct values of the target field broken down by the key field containing an integer value and aggregated over the key field containing a wild card value.

2.4.3 Adding Additional Stages

The savings in computation time provided by the multi-stage aggregation described above can be extended to additional stages of aggregation. Dependent and non-dependent key fields should be handled appropriately at each stage of the aggregation, as in the example below. For example, to reduce the dimensionality of a data set, wildcard values can be added to key fields that are to be removed. For non-dependent key fields, the pattern of wildcard values and specific values in the non-dependent key fields should not change once the pattern has been set by the initial rollup on the synthetic key and target field. If a non-dependent key field acquires a wildcard value during this initial rollup, then that key field should only be used to match values for subsequent rollup operations that omit that key field. If a non-dependent key field retains a specific value during the initial rollup, then that key field should only be used to match values for subsequent rollup operations that include that key field. If, as in the example described above, corresponding first stage and second stage key sets differ only in dependent key fields, a wildcard value will not be introduced into a non-dependent key field during a second stage processing, yielding a correct result.

Figure 7:
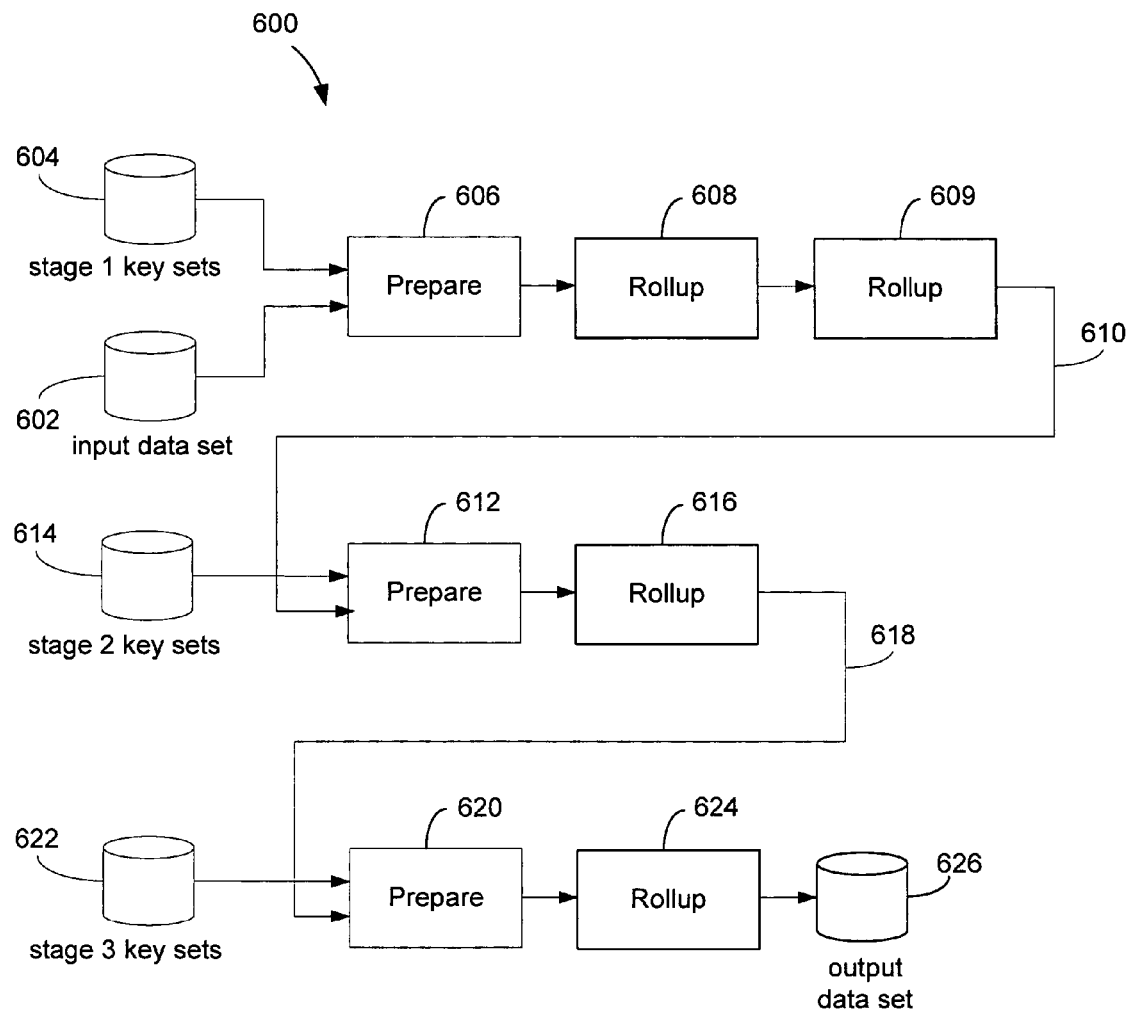

FIG. 7 shows an exemplary data flow graph 600 implementing a 3-stage aggregation computation. The Prepare component 606 processes the records of the input data set 602 based on key sets in the input file 604 that include non-dependent key fields. The Rollup component 608 combines records based on a target field and a synthetic key, and the Rollup component 609 combines records based on all key fields such that the intermediate records 610 have the same dimensionality as the input data set 602. The second stage key sets in the input file 614 include the non-dependent key fields and optionally some dependent key fields as appropriate to arrive at an intermediate data set 618 of some specified dimensionality. The third stage key sets in the input file 622 include the final key fields for generating the output data set 626 of a desired lower dimensionality.

For example, an input data set 602 has 4 dimensions, with 2 of the dimensions being dependent (key0 and key1) and 2 of the dimensions being non-dependent (key2 and key3). The output data set 626 includes aggregates having 2 or fewer dimensions based on a 3-dimensional intermediate data set 618. An appropriate 3-stage rollup plan for this example is represented in the following table.

| key set 1 | key set 2 | key set 3 |
|-----------|-----------|-----------|
| { }       | {0, 1, 2} | {0, 1}    |
| {2}       | {0, 1, 2} | {0, 2}    |
| {2}       | {0, 1, 2} | {1, 2}    |
| { }       | {0, 1, 2} | {0}       |
| { }       | {0, 1, 2} | {1}       |
| {2}       | {0, 1, 2} | {2}       |
| {3}       | {0, 1, 3} | {0, 3}    |
| {3}       | {0, 1, 3} | {1, 3}    |
| {3}       | {0, 1, 3} | {3}       |
| {2, 3}    | {0, 2, 3} | {2, 3}    |

As described above, the presence or absence of a non-dependent key field does not change between stage 1 and stage 3.

In some cases, the choice of key sets is determined by evaluating all possible key sets of appropriate dimensionality, ranking them in terms of the number of desired aggregates that can be generated from them, and selecting a key set with maximum rank, as in the procedure described in section 2.3.

3 Alternatives 3.1 Approximate Functional Dependency

The approaches for using functional dependency to reduce the size of an aggregation computation can be applied to cases in which the functional dependency is not strict due to the existence of exceptions. For example, in a retail chain there might be a weak functional dependency between "customer ID" and "store," such that 80% of all customers have only shopped at one store. There may also be "singleton" customers that have only a single transaction in a data set and therefore all of the fields for that customer are functionally dependent on the customer ID. By determining the number of singletons and the strengths of various functional dependencies, the input data set can be divided into several categories that can be handled appropriately.

3.2 Higher-Order Functional Dependency

In some cases it may be possible to use higher-order functional dependencies to reduce computation. Several key fields may be functionally dependent on the combination of a target field and another field.

For example, if there are 4 non-dependent dimensions and all 2-dimensional aggregates are desired, there would be 10 aggregates corresponding to 10 rollup operations. However, if dimensions 1-3 are dependent on the combination of dimension 0 and the target field, then the four rollup operations involving dimension 0 can be collapsed into a single rollup operation, and the set of rollup operations can be reduced from 10 to 7.

3.3 Implementations

The data aggregation approaches described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a medium, such as a CD-ROM, readable by a general or special purpose programmable computer or delivered (encoded in a propagated signal) over a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for aggregating data, including:
   accepting a first data set, the first data set including records, each record holding a value for each of a plurality of fields;
   generating a second data set from the first data set, the second data set including one or more aggregated records, each aggregated record of the second data set corresponding to one or more records from the first data set that match values in a subset of fields associated with that aggregated record;
   generating a third data set from the second data set, the third data set including one or more aggregated records, each aggregated record of the third data set corresponding to one or more aggregated records of the first data set that match values in a subset of fields associated with that aggregated record of the third data set;
   wherein an aggregate value associated with an aggregated record in the third data set represents a result of performing a computation based on a non-cascadable operation on values associated with a plurality of records from the first data set; and
   storing the data sets or presenting a result based on the data sets over a user interface.

2. The method of claim 1, wherein performing a non-cascadable operation on values associated with a plurality of records from the first data set is one of the group consisting of: determining a number of distinct values among said values, determining a median of said values, determining a sum of a plurality of extrema over said values, and determining an extremum of a plurality of sums of said values.

3. The method of claim 1, wherein the non-cascadable operation is such that a result of performing the non-cascadable operation on a set of operands does not decompose into a result of the operation performed on: a first result of the operation performed on a first subset of the operands, and a second result of the operation performed on a second subset of the operands; where the first and second subsets are mutually exclusive and exhaustive.

4. The method of claim 1, wherein at least one of the plurality of fields is at least partially functionally dependent on another of the plurality of fields.

5. The method of claim 4, wherein at least some values associated with at least one of the plurality of fields are dependent on a corresponding value associated with another of the plurality of fields.

6. The method of claim 1, wherein generating the third data set from the second data set includes receiving a flow of aggregated records of the second data set.

7. A computer-readable storage medium including instructions for causing a computer system to:
   accept a first data set, the first data set including records, each record holding a value for each of a plurality of fields;
   generate a second data set from the first data set, the second data set including one or more aggregated records, each aggregated record of the second data set corresponding to one or more records from the first data set that match values in a subset of fields associated with that aggregated record; and
   generate a third data set from the second data set, the third data set including one or more aggregated records, each aggregated record of the third data set corresponding to one or more aggregated records of the first data set that match values in a subset of fields associated with that aggregated record of the third data set;
   wherein an aggregate value associated with an aggregated record in the third data set represents a result of performing a computation based on a non-cascadable operation on values associated with a plurality of records from the first data set.

8. A system for aggregating data, including:
   means for accepting a first data set, the first data set including records, each record holding a value for each of a plurality of fields;
   means for generating a second data set from the first data set, the second data set including one or more aggregated records, each aggregated record of the second data set corresponding to one or more records from the first data set that match values in a subset of fields associated with that aggregated record; and
   means for generating a third data set from the second data set, the third data set including one or more aggregated records, each aggregated record of the third data set corresponding to one or more aggregated records of the first data set that match values in a subset of fields associated with that aggregated record of the third data set;
   wherein an aggregate value associated with an aggregated record in the third data set represents a result of performing a computation based on a non-cascadable operation on values associated with a plurality of records from the first data set.

9. A method for aggregating data comprising a plurality of records, each record holding a value for each of a plurality of fields, the method including:
   performing a multi-stage aggregation of fields within such records using a non-cascadable operation, taking into account functional dependencies between the fields, to generate aggregated data; and storing the aggregated data or presenting a result based on the aggregated data over a user interface.

10. The method of claim 9, wherein the non-cascadable operation is one of the group consisting of: determining a number of distinct values among said values, determining a median of said values, determining a sum of a plurality of extrema over said values, and determining an extremum of a plurality of sums of said values.

11. The method of claim 9, wherein the non-cascadable operation is such that a result of performing the non-cascadable operation on a set of operands does not decompose into a result of the operation performed on: a first result of the operation performed on a first subset of the operands, and a second result of the operation performed on a second subset of the operands; where the first and second subsets are mutually exclusive and exhaustive.

12. A method for aggregating data, including:
   accepting a first data set, the first data set including records, each record holding a value for each of a plurality of fields;
   generating a Cartesian product of records of the first data set and a first plurality of key sets, each key set representing a subset of the fields of the first data set;
   generating a second data set from the generated Cartesian product, the second data set including one or more aggregated records, each aggregated record corresponding to one or more records from the first data set that match values in a subset of fields associated with the aggregated record;
   generating a third data set from the second data set, the third data set including one or more aggregated records, each aggregated record of the third data set corresponding to one or more aggregated records of the first data set that match values in a subset of fields associated with that aggregated record of the third data set; and
   storing the data sets or presenting a result based on the data sets over a user interface.

13. The method of claim 12, wherein generating the third data set includes performing a join operation on the generated Cartesian product and a data set whose records contain a first value that represents one of the first plurality of key sets and a second value that represents one of a second plurality of key sets, each of the second plurality of key sets representing a subset of the fields of the second data set; where the join operation joins records with matching key sets.

14. The method of claim 13, wherein generating the third data set includes, for at least some joined records, replacing a value for at least one of the fields with a wildcard value.

15. The method of claim 12, wherein generating the second data set includes, for at least some records of the generated Cartesian product, replacing a value for at least one of the fields with a wildcard value.

16. A computer-readable storage medium including instructions for causing a computer system to:
   accept a first data set, the first data set including records, each record holding a value for each of a plurality of fields;
   generate a Cartesian product of records of the first data set and a first plurality of key sets, each key set representing a subset of the fields of the first data set;
   generate a second data set from the generated Cartesian product, the second data set including one or more aggregated records, each aggregated record corresponding to one or more records from the first data set that match values in a subset of fields associated with the aggregated record; and
   generate a third data set from the second data set, the third data set including one or more aggregated records, each aggregated record of the third data set corresponding to one or more aggregated records of the first data set that match values in a subset of fields associated with that aggregated record of the third data set.

17. A system for aggregating data, including:
   means for accepting a first data set, the first data set including records, each record holding a value for each of a plurality of fields;
   means for generating a Cartesian product of records of the first data set and a first plurality of key sets, each key set representing a subset of the fields of the first data set;
   means for generating a second data set from the generated Cartesian product, the second data set including one or more aggregated records, each aggregated record corresponding to one or more records from the first data set that match values in a subset of fields associated with the aggregated record; and
   means for generating a third data set from the second data set, the third data set including one or more aggregated records, each aggregated record of the third data set corresponding to one or more aggregated records of the first data set that match values in a subset of fields associated with that aggregated record of the third data set.

* * * * *